(12) United States Patent
Lee et al.

(10) Patent No.: US 10,150,276 B2
(45) Date of Patent: Dec. 11, 2018

(54) OUTER COVERING MATERIAL FOR VACUUM HEAT INSULATION MATERIAL AND VACUUM HEAT INSULATION MATERIAL COMPRISING SAME

(71) Applicant: LG Hausys, Ltd., Seoul (KR)

(72) Inventors: Myung Lee, Suwon-si (KR); Ha-Na Kim, Seoul (KR); Seong-Moon Jung, Daejeon (KR); Eun-Joo Kim, Uiwang-si (KR)

(73) Assignee: LG Hausys, Ltd., Seoul (KR)

( * ) Notice: Subject to any disclaimer, the term of this patent is extended or adjusted under 35 U.S.C. 154(b) by 44 days.

(21) Appl. No.: 15/305,102

(22) PCT Filed: Apr. 20, 2015

(86) PCT No.: PCT/KR2015/003916
§ 371 (c)(1),
(2) Date: Oct. 19, 2016

(87) PCT Pub. No.: WO2015/163650
PCT Pub. Date: Oct. 29, 2015

(65) Prior Publication Data
US 2017/0043563 A1  Feb. 16, 2017

(30) Foreign Application Priority Data
Apr. 23, 2014 (KR) ........................ 10-2014-0048921

(51) Int. Cl.
*F16L 59/065* (2006.01)
*B32B 27/08* (2006.01)
(Continued)

(52) U.S. Cl.
CPC ............... *B32B 27/08* (2013.01); *B32B 5/02* (2013.01); *B32B 7/12* (2013.01); *B32B 15/08* (2013.01);
(Continued)

(58) Field of Classification Search
CPC ..... Y10T 428/231; F16L 59/065; E04B 1/803
See application file for complete search history.

(56) References Cited

U.S. PATENT DOCUMENTS

| 8,747,986 B2 * | 6/2014 | Hsu ........................... B32B 5/18 428/323 |
| 2004/0180176 A1 * | 9/2004 | Rusek, Jr. ............... E04B 1/803 428/69 |
| 2011/0165367 A1 * | 7/2011 | Kojima ................... E04B 1/803 428/69 |
| 2014/0216100 A1 * | 8/2014 | Toshimitsu ........... F16L 59/065 62/440 |

FOREIGN PATENT DOCUMENTS

| CN | 101046271 A | 10/2007 |
| CN | 102105735 A | 6/2011 |

(Continued)

OTHER PUBLICATIONS

International Search Report dated Jun. 30, 2015 corresponding to International Application No. PCT/KR2015/003916, citing the above reference(s).

(Continued)

*Primary Examiner* — Alexander S Thomas
(74) *Attorney, Agent, or Firm* — Hauptman Ham, LLP

(57) ABSTRACT

Provided is an outer covering material for a vacuum heat insulation material, the outer covering material having a laminated structure which sequentially, from the top, comprises: a protecting layer; a barrier layer; and a sealing material, wherein the barrier layer comprises: a polyethylene terephthalate (PET) resin film on which an aluminum oxide film is deposited; and an ethylene vinyl alcohol (EVOH) resin film on which a metal thin film is deposited.
Provided is a vacuum heat insulation material, comprising: a core material consisting of glass fibers; and the outer (Continued)

covering material which houses the core material and decompresses the inner portion thereof.

5 Claims, 1 Drawing Sheet

(51) Int. Cl.
  *B32B 15/08* (2006.01)
  *B32B 27/06* (2006.01)
  *B32B 5/02* (2006.01)
  *B32B 7/12* (2006.01)
  *B32B 27/30* (2006.01)
  *B32B 27/32* (2006.01)
  *B32B 27/34* (2006.01)
  *B32B 27/36* (2006.01)
(52) U.S. Cl.
  CPC ............ *B32B 27/06* (2013.01); *B32B 27/306* (2013.01); *B32B 27/32* (2013.01); *B32B 27/34* (2013.01); *B32B 27/36* (2013.01); *B32B 2255/10* (2013.01); *B32B 2255/20* (2013.01); *B32B 2255/205* (2013.01); *B32B 2262/101* (2013.01); *B32B 2307/304* (2013.01); *B32B 2307/31* (2013.01); *B32B 2307/7244* (2013.01); *B32B 2307/7246* (2013.01); *F16L 59/065* (2013.01); *Y10T 428/231* (2015.01)

(56) References Cited

FOREIGN PATENT DOCUMENTS

| | | |
|---|---|---|
| CN | 103562613 A | 2/2014 |
| JP | 2008-008353 A | 1/2008 |
| KR | 10-2007-0098486 A | 10/2007 |
| KR | 10-2011-0072795 A | 6/2011 |
| KR | 10-2012-0016743 A | 2/2012 |
| KR | 10-2012-0021948 A | 3/2012 |

OTHER PUBLICATIONS

Chinese Office Action dated Mar. 2, 2018, issued in corresponding Chinese Patent Application No. 201580021731.7, citing the above reference(s).

* cited by examiner

OUTER COVERING MATERIAL FOR VACUUM HEAT INSULATION MATERIAL AND VACUUM HEAT INSULATION MATERIAL COMPRISING SAME

CROSS REFERENCE TO RELATED APPLICATION

This application claims the priority of Korean Patent Application No. 10-2014-0048921, filed on Apr. 23, 2014 in the KIPO (Korean Intellectual Property Office). Further, this application is the National Phase application of International Application No. PCT/KR2015/003916 filed Apr. 20, 2015, which designates the United States and was published in Korean.

TECHNICAL FIELD

The present disclosure relates to an outer covering material for a vacuum heat insulation material and a vacuum heat insulation material comprising the same.

BACKGROUND ART

Vacuum heat insulation material includes an outer covering material having a low gas or water permeation and a core material under vacuum state. In this reason, the vacuum heat insulation material is significantly excellent in heat shielding effect and has higher thermal insulation performance than existing heat insulation material such as polyurethane or Styrofoam. Thus, the vacuum heat insulation material is a high end material that currently has increasing demand.

The outer covering material for a typical vacuum heat insulation material is composed of a composite film with a plurality of layers laminated. The composite film basically comprises a protective layer, a barrier layer, and a sealing layer. The protective layer serves to ensure that the vacuum heat insulation material can primarily be protected from an external impact. The barrier layer serves to maintain an internal degree of vacuum and block ingress of an external gas or water vapor. The sealing layer serves to allow a close contact with the outer covering material and make the core material to keep a panel form.

DISCLOSURE

Technical Problem

It is an aspect of the present disclosure to provide an outer covering material for vacuum heat insulation material having a barrier layer, including: a polyethylene terephthalate (PET) resin film on which an aluminum oxide film is deposited to prevent an ingress of an external gas, air, or moisture; and an ethylene vinyl alcohol (EVOH) resin film on which a metal thin film is deposited.

It is an another aspect of the present disclosure to provide a vacuum heat insulation material formed by accommodating a core material into the outer covering material for vacuum heat insulation material and reducing an internal pressure.

Technical Solution

In one embodiment of the present disclosure, provided is an outer covering material for vacuum heat insulation material, which is a laminated structure, sequentially including, from the top: a protective layer; a barrier layer; and a sealing layer, wherein the barrier layer includes a polyethylene terephthalate (PET) resin film on which an aluminum oxide film is deposited; and an ethylene vinyl alcohol (EVOH) resin film on which a metal thin film is deposited.

More specifically, the barrier layer includes a polyethylene terephthalate (PET) resin film on which an aluminum oxide film is deposited; and an ethylene vinyl alcohol (EVOH) resin film on which a metal thin film is deposited; that is, the barrier layer may sequentially include, from the top, an aluminum oxide film, a polyethylene terephthalate (PET) resin film, a metal thin film, and an ethylene vinyl alcohol (EVOH) resin film.

The aluminum oxide film may have a thickness of about 1.0 μm or less.

The PET film may have a thickness of about 10 μm to about 20 μm.

The metal thin film may have a thickness of about 1 μm or less.

The EVOH film may have a thickness of about 10 μm to about 20 μm.

The sealing layer may include a thermoplastic plastic film having a melting point of about 125° C. or more.

The thermoplastic plastic film may include a non-stretched polypropylene (CPP) film, or a linear low density polyethylene (LLDPE) film.

The CPP film or the EVOH film may have a thickness of about 25 μm to about 60 μm.

The protective layer may include a nylon film.

The nylon film may have a thickness of about 15 μm to about 25 μm.

The outer covering material for vacuum heat insulation material may have a water vapor permeability of about 0.01 to about 0.1 g/m²·day at 38° C. under 100% RH atmosphere.

In another embodiment of the present disclosure, provided is a vacuum heat insulation material, including: a core material made of a glass fiber; and an outer covering material accommodating the core material and having a reduced internal pressure.

The glass fiber may have an average diameter of about 4 μm or less.

Advantageous Effects

The outer covering material for vacuum heat insulation material can have excellent barrier property even without including an aluminum foil and minimize a thermal bridge even without including an aluminum deposited film.

DESCRIPTION OF SYMBOLS

Figure 1:
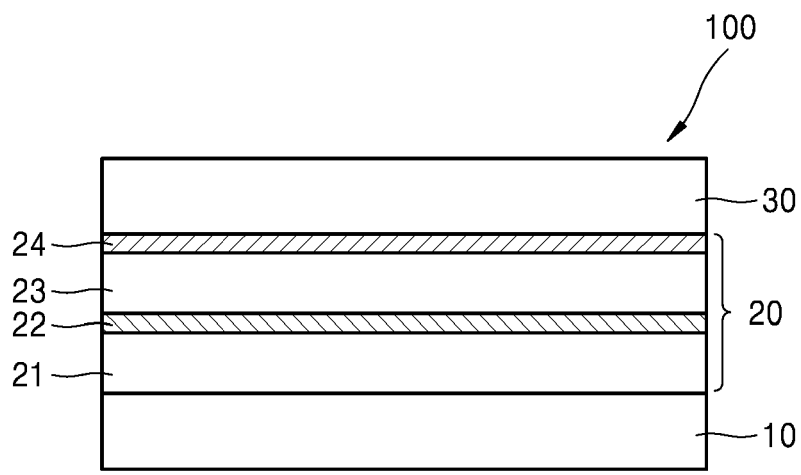
FIG. 1 shows a schematic cross sectional view of the outer covering material for vacuum heat insulation material in accordance with the present disclosure.

100: outer covering material
200: core material
300: getter material
10: sealing layer
20: barrier layer
30: protective layer
21: EVOH film
22: metal thin film 23: PET film
24: aluminum oxide film

BEST MODE

Hereinafter, embodiments of the present disclosure will be described in detail with reference to the accompanying drawings. It should be understood that the present disclosure is not limited to the following embodiments, and that the embodiments are provided for illustrative purposes only. The scope of the disclosure should be defined only by the accompanying claims and equivalents thereof.

Outer Covering Material for Vacuum Heat Insulation Material

In one embodiment of the present disclosure, provided is an outer covering material for vacuum heat insulation material, which is a laminated structure, sequentially including, from the top: a protective layer; a barrier layer; and a sealing layer, wherein the barrier layer includes a polyethylene terephthalate (PET) resin film on which an aluminum oxide film is deposited; and an ethylene vinyl alcohol (EVOH) resin film on which a metal thin film is deposited.

Conventional outer cover material for vacuum heat insulation material is mainly composed of a multi-layer film with an aluminum deposited resin film or an aluminum foil, and a core material therefor includes glass fiber, fumed silica, and the like. In addition, a getter material may be applied for adsorbing water, air and gas within the vacuum heat insulation material.

In this embodiment, the thermal conductivity of the vacuum heat insulation material may be measured higher than that of an initial thermal conductivity over time, since the internal pressure increases due to the ingress of water and air from outside thereof.

Thus, a need for outer covering material for vacuum heat insulation material preventing the increase of the internal pressure within the vacuum heat insulation material over time has been increased. In the case of the outer covering material on which an aluminum foil is applied, low moisture permeability or low oxygen transmission rate has been able to achieve excellent barrier performance. However, although this is advantageous in terms of the long term durability, the heat transfer via the aluminum foil causes a heat bridge, thereby increasing a thermal conductivity in the overall vacuum heat insulation material.

Meanwhile, in the case of using an aluminum deposited resin film, although no heat bridge occurs, the long-term durability is deteriorated and thereby difficult to apply to the outer covering material for vacuum heat insulation material.

Thus, since the outer covering material for vacuum heat insulation material includes a barrier layer including a polyethylene terephthalate (PET) resin film on which an aluminum oxide film is deposited; and an ethylene vinyl alcohol (EVOH) resin film on which a metal thin film is deposited, the outer covering material for vacuum heat insulation material can have excellent barrier property even without including an aluminum foil and minimize a thermal bridge even without including an aluminum deposited film.

FIG. 1 shows a schematic cross sectional view of the outer covering material for vacuum heat insulation material in accordance with one embodiment of the present disclosure. Referring to FIG. 1, the outer covering material 100 for vacuum heat insulation material is a laminated structure, sequentially including, from the top, a protective layer 30, a barrier layer 20, and a sealing layer 10.

In this embodiment, the barrier layer 20 is made to prevent water and air from penetrating from the outside, and may include a polyethylene terephthalate (PET) resin film 23 on which an aluminum oxide film 24 is deposited; and an ethylene vinyl alcohol (EVOH) resin film 21 on which a metal thin film 22 is deposited.

For example, in the case of using a barrier layer including an aluminum deposited film to overcome the disadvantage resulting from the thermal bridge in the aluminum foil, although the gas permeation at room temperature is similar with the barrier layer including an aluminum foil, the barrier property is rapidly lowered compared to a barrier layer comprising an aluminum foil at a temperature of about 70° C. or more, or a relative humidity of about 90% or more.

This is due to the fact that, in the case of aluminum foil, even though the temperature rises from room temperature to about 70° C., no changes in barrier property occurs, but in the case of aluminum foil deposited resin film, the barrier property deteriorates as temperature increases.

Therefore, since the barrier layer 20 includes a polyethylene terephthalate (PET) resin film 23 on which an aluminum oxide film 24 is deposited; and an ethylene vinyl alcohol (EVOH) resin film 21 on which a metal thin film 22 is deposited, at the same time, the long term durability can be maximized together with the barrier property.

Specifically, the barrier layer may include a polyethylene terephthalate (PET) resin film on which an aluminum oxide film is deposited; and an ethylene vinyl alcohol (EVOH) resin film on which a metal thin film is deposited; whereby it can sequentially include, from the top, an aluminum oxide film, a polyethylene terephthalate (PET) resin film, a metal thin film, and an ethylene vinyl alcohol (EVOH) resin film.

The PET film on which aluminum oxide film is deposited has lower transmission rate compared to the PET film on which aluminum is deposited, since the former has higher density than the latter. Therefore, the outer covering material for vacuum heat insulation material is applicable to a vacuum heat insulation material in such a way that the PET film on which the aluminum oxide film is deposited could be positioned outside the PET film on which aluminum is deposited, through the barrier layer sequentially including, from the top, an aluminum oxide film, a polyethylene terephthalate (PET) resin film, a metal thin film, and an ethylene vinyl alcohol (EVOH) resin film, thereby capable of achieving an excellent barrier property.

Further, since the thermal conductivity of aluminum is about 200 W/mK or more, while the thermal conductivity of aluminum oxide film is about 30 W/mK, it is possible to maintain the barrier property as the level of the barrier layer having the aluminum foil without thermal bridges.

The aluminum oxide film may have a thickness of about 1.0 µm or less, such as about 0.1 µm to about 0.2 µm. The aluminum oxide film is produced by a reaction of aluminum and oxygen, also referred to as aluminum oxide ($Al_2O_3$) having a predetermined thickness, and may be deposited on a PET film by a physical or chemical method.

In addition, the thermal bridges can be minimized by maintaining the film thickness of the aluminum oxide film within aforesaid range.

The PET film may have a thickness of about 10 µm to about 20 µm. When the thickness of the PET film is less than about 10 µm, the abrasion resistance and puncture resistance may be degraded. When the thickness of the PET film exceeds 20 µm, defects may occur upon folding edges after manufacture of the vacuum heat insulation material due to the nature of the PET film. Thus, through maintaining the thickness of the PET film within aforesaid range, it is possible to improve the durability of the vacuum heat insulation material, as well as to reduce the defect rate during the manufacturing process.

As used herein, the puncture resistance refers to a property that withstands a penetration when puncturing the outer covering material by a sharp pointed tool. The puncture resistance can be measured by a load under which a surface of the outer covering material is penetrated upon being punctuated by a sharp pointed tool. As the puncture resistance is good, the defect rate can be minimized during the manufacture of the vacuum heat insulation material.

Further, with the outer covering material for vacuum heat insulation material, the edge portion is folded in the manufacture of the vacuum heat insulation material, and thereby a folded portion may essentially be formed. Property degradation at the folded portion may give an adverse effect on the durability of the overall vacuum heat insulation material. However, the EVOH film has a smallest change in the barrier performance when folded compared to the other resin film. As such, it is advantageous to use the EVOH film on which a metal thin film is deposited to minimize the degradation of the barrier performance caused by the folded portion. For example, the EVOH film may be weak in the moisture barrier property, but due to the deposited metal thin film, the moisture barrier property can be improved.

In addition, although the metal thin film is deposited, since both the inherent properties of the EVOH film and the barrier property of the metal thin film is exhibited at the same time, the barrier performance at the folded portion can be maximized.

The metal thin film may have a thickness of about 1 μm or less, such as about 0.05 μm to about 0.1 μm. For example, the metal thin film may include copper, gold, silver, nickel, titanium, zirconium, silicon, indium, carbon, cobalt, or a mixture thereof, as well as aluminum, and the metal thin film may be deposited on the EVOH film by a physical or chemical method.

The barrier performance can easily be implemented by maintaining the film thickness of the metal thin film within aforesaid range.

The EVOH film may have a thickness of about 10 μm to about 20 μm. When the thickness of the EVOH film is less than about 10 μm, the barrier performance may be degraded. When the thickness of the EVOH film exceeds 20 μm, defect rates may increase upon folding edges after the manufacture of the vacuum insulation material since the thickness of the outer covering material for vacuum heat insulation material increases. Thus, it is advantageous that through maintaining the thickness of the EVOH film within aforesaid range, the durability of the vacuum heat insulation material can be maintained, as well as the defect rate can be reduced.

The polyethylene terephthalate (PET) resin film 23 on which the aluminum oxide film 24 is deposited, and the ethylene vinyl alcohol (EVOH) resin film 21 on which the metal thin film 22 is deposited can be bonded by a conventional adhesive.

The sealing layer 10 is intended to maintain the vacuum of the outer cover material inside the vacuum heat insulation material. When a thermoplastic plastic film is employed having a melting point of about 125° C. or more, such as 125° C. to about 170° C., it can exhibit the barrier performance at high temperature. When the melting point of the thermoplastic plastic film is less than about 125° C., the barrier performance at high temperature can be lowered rapidly.

For example, if the thermoplastic plastic film is LLDPE film, a typical melting point is around 115° C., but the heat resistance of the LLDPE film can be enhanced to raise the melting point more than 10° C., and when the melting point is greater than or equal to about 125° C., it is possible to maintain the barrier performance at high temperature.

The sealing layer may be in contact with a core material when forming a vacuum heat insulation material. Through this portion, a gas or water may be permeated. In this regard, typical sealing layer is very poor in the barrier property, and in particular the barrier property is significantly degraded at high temperature conditions.

In addition, there has been a problem in that the long-term durability of the vacuum heat insulation material decreases since a gas or moisture is permeated into the vacuum heat insulation material through the sealing layer.

In order to solve the above problem, a thermoplastic plastic film having a goof barrier property at high temperature can be used, and may include a non-stretched polypropylene (CPP) film, or a linear low density polyethylene (LLDPE) film.

In the case of the CPP film, this film is excellent in heat resistant that can be applied to a retort pouch for warming in boiling water. Thus, the barrier property of this film is superior to polyethylene (PE) film at room temperature as well as even at higher temperature. Specifically, the oxygen permeability for the CPP film at room temperature is about 1300 cc/m$^2$·day; one-third the level of PE film, and the moisture permeability for the PE film, about 14 g/m$^2$·day, but for the CPP film, about 7 g/m$^2$·day; one half level of the PE film.

The CPP film may have a thickness of about 25 μm to about 60 μm. When the CPP film has a thickness less than about 25 μm, a sealing strength may be lowered. When it exceeds about 60 μm, a horizontal permeability of the sealing layer may increase. Within these ranges, it can exhibit its performance as a sealing layer.

For the LLDPE film, the melting point can be improved more than about 125° C., and the barrier property at high temperature can be maintained. Specifically, the LLDPE film may have a thickness of about 25 μm to about 60 μm. When the LLDPE film has a thickness less than about 25 μm, the sealing strength may be lowered as in the CPP film. When it exceeds about 60 μm, the horizontal permeability of the sealing layer may increase. Within these ranges, the LLDPE film can exhibit its performance as a sealing layer.

The protective layer 30 is intended to minimize damages on the outer covering material for vacuum heat insulation material against the external impact of for example scratches, nicks, or the like, and may include a nylon film. For the protective layer, the nylon may be arranged in an outermost layer to protect the vacuum heat insulation material from an external impact that may be encountered in the manufacturing and shipping of the vacuum heat insulation material, wherein the nylon has excellent wear resistance property compared to the PET film.

The nylon film may have a thickness of about 15 μm to about 25 μm. When the nylon film has a thickness less than about 15 μm, the impact resistance may be lowered. When it exceeds about 30 μm, the ductility of the outer covering material for vacuum heat insulation material may degrade. Within these ranges, the nylon film can exhibit its performance as a protective layer.

The outer covering material for vacuum heat insulation material may have a water vapor permeability of about 0.01 to about 0.1 g/m$^2$·day at 38° C. under 100% RH atmosphere. As used herein, the water vapor permeability refers to an extent that water vapor is permeated through the outer covering material, and indicates an amount of the water vapor permeated for 24 hours over 1 m$^2$ surface area for the outer covering material in gram under certain conditions. In this regard, the lower the water vapor permeability of the outer covering material for vacuum heat insulation material, the barrier property is excellent.

The outer covering material for vacuum heat insulation material is a laminated structure, which sequentially includes the protective layer, the barrier layer, and the sealing layer as described above, and can implement excellent heat insulating performance and long-term durability at the same time. Thus, the outer covering material for vacuum insulation material can maintain the relatively lower ranged water vapor permeability than a typical vacuum heat insulation material.

Vacuum Heat Insulation Material

In another embodiment of the present disclosure, provided is a vacuum heat insulation material, including: a core material made of a glass fiber; and an outer covering material accommodating the core material and having a reduced internal pressure.

Figure 2:
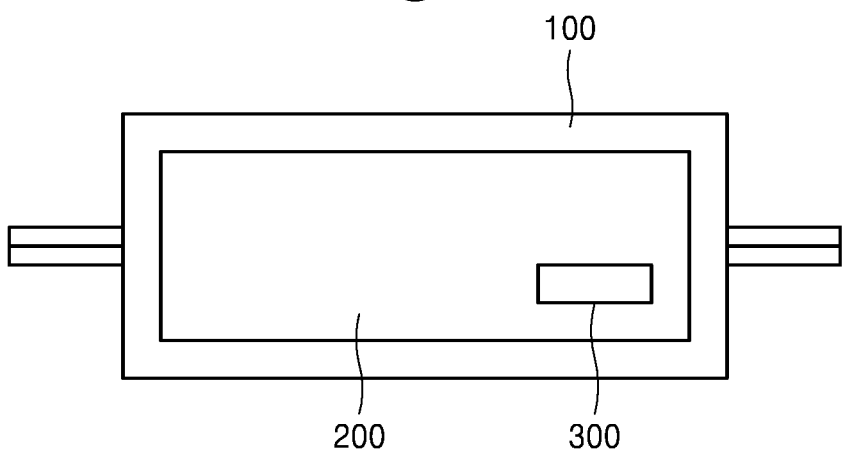
FIG. 2 shows a schematic view of a vacuum heat insulation material in accordance with another embodiment of the present disclosure.

FIG. 2 shows a schematic view of a vacuum heat insulation material in accordance with another embodiment of the present disclosure. The vacuum heat insulation material includes a core material 200 and an outer covering material 100, wherein the outer covering material 10 is as described above, and the vacuum heat insulation material comprising the outer covering material therefor can implement excellent heat insulating performance and long-term durability at the same time.

Referring to FIGS. 1 and 2, the vacuum heat insulation material may be prepared by sealing the core material 200 with the outer covering material 100. Specifically, the vacuum heat insulation material can be prepared by housing the core material 200 into the outer covering material 100 disposed such that it sequentially includes, from the outside, the protective layer 30, the barrier layer 20, and the sealing layer 10.

In this embodiment, the barrier layer 20 is a laminated structure having PET film 23 on which aluminum oxide film 24 is deposited, and EVOH film 21 on which metal thin film 22 is deposited, wherein the PET film on which aluminum oxide film 24 is deposited may be positioned outside far more than the EVOH film 21 on which metal thin film 22 is deposited, and through this positional relationship both the excellent barrier property and the enhanced thermal insulation performance can be ensured.

The core material contained in the vacuum heat insulation material may be made of a glass fiber. Specifically, the diameter of the glass fiber is associated with the long term durability of the vacuum heat insulation material. For example, since the larger the diameter of the glass fiber is, the larger the inner pore size of the core material, it is disadvantageous in terms of the long term durability. Further, since the smaller the diameter of the glass fiber is, the smaller the inner size of the core material, it is advantageous in terms of the long term durability.

Therefore, it is advantageous in terms of the maintenance of the long term durability of the vacuum heat insulation material that the average diameter of the glass fiber is kept up to about 4 μm. When the average diameter of the glass fiber exceeds about 4 μm, since the inner pore size of the core material becomes larger, the convection of the gas entering thereinto may be highly generated, thereby degrading the long term durability of the vacuum heat insulation material.

Referring to FIG. 2, the core material 200 may further include a getter material 300 having a surface area of about 1 $m^2/g$ to about 100 $m^2/g$. For the getter material, although the higher the surface area thereof is, the ability to adsorb a water vapor is excellent, it is advantageous to maintain the surface area within above range in terms of appropriate mechanical properties and adsorption capability.

Hereinafter, preferred examples of the present disclosure will be described. However, it should be noted that while the preferred examples are listed for easy understanding of the contents of the present disclosure, the present disclosure is not limited to these examples.

EXAMPLES AND COMPARATIVE EXAMPLES

Example 1

A core material made of a glass fiber having an average diameter of less than 2 μm was manufactured in size 190×250×8 mm (thickness×width×length) and was used as a core material for vacuum heat insulation material.

Then, from the outermost layer, nylon film 25 μm, PET film 12 μm on which aluminum oxide film 0.1 μm is deposited, EVOH film 12 μm on which aluminum 0.1 μm is deposited, and CPP film 30 μm having a melting point of 165° C. were laminated and respectively bonded with a two-component polyurethane based adhesive to form an outer covering material.

Then, a getter material made by introducing calcium oxide (CaO) (4 g, 95% purity) having a specific surface area of 4 $m^2/g$ into a pouch was inserted into a surface of the core material.

Then, a vacuum heat insulation material having a size 200×200×8 mm (thickness×width×length) was manufactured by inserting the core material into the outer covering material, followed by sealing under 10 Pa vacuum.

Example 2

The vacuum heat insulation material was manufactured in the same way as Example 1, except that, from the outermost layer, nylon film 25 μm, PET film 12 μm on which aluminum oxide film 0.05 μm is deposited, EVOH film 12 μm on which aluminum 0.05 μm is deposited, and LLDPE film 50 μm having a melting point of 128° C. were laminated to form an outer covering material.

Example 3

The vacuum heat insulation material was manufactured in the same way as Example 1, except that a core material made of a glass fiber having an average diameter of greater than 4 μm was used.

Example 4

The vacuum heat insulation material was manufactured in the same way as Example 1, except that, from the outermost layer, nylon film 15 μm, PET film 12 μm on which aluminum oxide film 2.0 μm is deposited, EVOH film 12 μm on which aluminum 0.1 μm is deposited, and CPP film 30 μm having a melting point of 165° C. were laminated to form an outer covering material.

Example 5

The vacuum heat insulation material was manufactured in the same way as Example 1, except that, from the outermost layer, nylon film 15 μm, PET film 12 μm on which aluminum oxide film 0.1 μm is deposited, EVOH film 12 μm on which aluminum 2.0 μm is deposited, and CPP film 30 μm having a melting point of 165° C. were laminated to form an outer covering material.

Comparative Example 1

The vacuum heat insulation material was manufactured in the same way as Example 1, except that, from the outermost layer, nylon film 15 μm, PET film 12 μm on which aluminum oxide film 0.1 μm is deposited, EVOH film 12 μm on which aluminum 0.1 μm is deposited, and CPP film 30 μm having a melting point of 165° C. were laminated to form an outer covering material.

Comparative Example 2

The vacuum heat insulation material was manufactured in the same way as

Example 1, except that, from the outermost layer, nylon film 25 μm, PET film 12 μm on which aluminum oxide film 0.1 μm is deposited, and LLDPE film 30 μm having a melting point of 125° C. were laminated to form an outer covering material.

Comparative Example 3

The vacuum heat insulation material was manufactured in the same way as Example 1, except that, from the outermost layer, nylon film 25 μm, PET film 12 μm on which aluminum oxide film 0.1 μm is deposited, EVOH film 12 μm, and LLDPE film 30 μm having a melting point of 125° C. were laminated to form an outer covering material.

Experiment—Physical Properties of Vacuum Heat Insulation Material

1) Water vapor permeability: The water vapor permeability for the outer covering material for vacuum heat insulation material manufactured in the Examples and Comparative Examples was measured by water content permeated through the outer covering material for vacuum heat insulation material per 1 m² area and 24 hours with Aquatran equipment (Mocon Inc.) at 38° C. under 100% relative humidity.
2) Long-term durability: The changes in the thermal conductivity for the vacuum heat insulation material manufactured in the Examples and Comparative Examples was measured relative to an initial thermal conductivity using thermal conductivity meter HC-074-200 (EKO Ltd.) after allowing the vacuum heat insulation material to stand for 10 days at 70° C. under 90% relative humidity.
3) Thermal conductivity of edge portion: The thermal conductivity of the edge portion was measured after matching the end of the vacuum heat insulation material manufactured in the Examples and Comparative Examples with the end of the sensor of the thermal conductivity meter HC-074-200 (EKO Ltd.).

TABLE 1

| | Water vapor permeability (g/m² · day) | Changes relative to initial thermal conductivity (mW/mK) | Thermal conductivity of edge portion (mW/mK) |
| --- | --- | --- | --- |
| Ex. 1 | 0.02 | 1.01 | 3.60 |
| Ex. 2 | 0.03 | 1.05 | 3.55 |
| Ex. 3 | 0.02 | 14.5 | 3.60 |
| Ex. 4 | 0.01 | 1.00 | 5.10 |
| Ex. 5 | 0.01 | 1.00 | 6.10 |

TABLE 1-continued

| | Water vapor permeability (g/m² · day) | Changes relative to initial thermal conductivity (mW/mK) | Thermal conductivity of edge portion (mW/mK) |
| --- | --- | --- | --- |
| C. Ex. 1 | 0.40 | 14.3 | 4.10 |
| C. Ex. 2 | 0.30 | 14.1 | 3.50 |
| C. Ex. 3 | 0.50 | 14.6 | 3.50 |

The water vapor permeability of the outer covering material for vacuum heat insulation material in Examples 1 and 2 was measured lower than that of Comparative Examples 1 to 4. Further, lower changes relative to the initial thermal conductivity of the vacuum heat insulation material was measured. From these results, the barrier property for Examples 1 and 2 was found to be superior to Comparative Examples 1 to 4.

Specifically, with respect to Example 3, the outer covering material for vacuum heat insulation material was same, but the core material was made of a glass fiber with an average diameter of greater than 4 μm, and thus due to a large inner pore size of the core material, the convection of the gas entering into the interior is largely generated compared to Examples 1 and 2. Therefore, although the water vapor permeability was similar to Examples 1 and 2, the changes relative to the initial thermal conductivity show higher than Examples 1 and 2.

In addition, on the PET film in Example 4 the aluminum oxide film with 2.0 μm thick was deposited, and on the EVOH film in Example 5 the aluminum with 2.0 μm thick was deposited. In these cases, both the water vapor permeability and the changes relative to the initial thermal conductivity were excellent, but higher thermal conductivity of the edge portion was measured. Therefore, it can be found that if the thickness of the aluminum oxide film and the aluminum was out of a predetermined range, the heat loss of the edge portion in the vacuum heat insulation material increases.

Meanwhile, the PET film on which aluminum film is deposited was applied instead of the PET film on which aluminum oxide film is deposited in Comparative Example 1. In this case, the barrier property of the aluminum coated PET film was relatively degraded.

Further, with respect to Comparative Example 2 without including EVOH film on which aluminum is deposited, and Comparative Example 3 with including EVOH film on which aluminum is not deposited, the barrier property was degraded at the folded portion in the edge during the manufacture of the vacuum heat insulation material, and therefore the water vapor permeability and the changes relative to the initial thermal conductivity were reduced.

The invention claimed is:
1. A vacuum heat insulation material, comprising:
   a core material made of a glass fiber, wherein the glass fiber has an average diameter of more than 0 μm and 2 μm or less;
   an outer covering material accommodating the core material and having a reduced internal pressure, wherein the outer covering material has a laminated structure sequentially comprising, from an outermost layer:
   a protective layer, wherein the protective layer comprises a nylon film;
   an aluminum oxide film, wherein the aluminum oxide film has a thickness ranging from 0.1 μto 0.2 μm;
   a polyethylene terephthalate (PET) resin film, wherein the PET resin film has a thickness ranging from 10 μm to 12 μm;

a metal thin film, wherein the metal thin film has a thickness ranging from 0.05 μm to 0.1 μm;

an ethylene vinyl alcohol (EVOH) resin film, wherein EVOH resin film has a thickness ranging from 10 μm to 12 μm; and a sealing layer, wherein the sealing layer comprises a thermoplastic plastic film, and the thermoplastic plastic film comprises a non-stretched polypropylene (CPP) film.

2. The vacuum heat insulation material according to claim 1, wherein the sealing layer comprises a thermoplastic plastic film having a melting point of 125° C. or more.

3. The vacuum heat insulation material according to claim 1, wherein the CPP film has a thickness of 25 μm to 60 μm.

4. The vacuum heat insulation material according to claim 1, wherein the nylon film has a thickness of 15μm to 25 μm.

5. The vacuum heat insulation material according to claim 1, wherein the outer covering material has a water vapor permeability of 0.01 to 0.1 $g/m^2 \cdot day$ at 38° C. under 100% RH atmosphere.

* * * * *